US012663750B2

(12) United States Patent
Sakamoto

(10) Patent No.: US 12,663,750 B2
(45) Date of Patent: Jun. 23, 2026

(54) DRIVE TRANSMITTER, DRIVER, AND IMAGE FORMING APPARATUS

(71) Applicant: Shogo Sakamoto, Kanagawa (JP)

(72) Inventor: Shogo Sakamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/939,801

(22) Filed: Nov. 7, 2024

(65) Prior Publication Data

US 2025/0155844 A1 May 15, 2025

(30) Foreign Application Priority Data

Nov. 13, 2023 (JP) ................................. 2023-193205

(51) Int. Cl.
*G03G 21/16* (2006.01)
*G03G 15/00* (2006.01)

(52) U.S. Cl.
CPC ....... *G03G 21/1652* (2013.01); *G03G 15/757* (2013.01); *G03G 2221/1657* (2013.01)

(58) Field of Classification Search
CPC ............. G03G 21/1652; G03G 15/757; G03G 2221/166; F16D 27/14; F16D 2027/001; F16D 2300/12
See application file for complete search history.

(56) References Cited

U.S. PATENT DOCUMENTS 7,419,039 B2 * 9/2008 Yasui ...................... F16D 27/10 192/84.8
11,500,321 B2 * 11/2022 Nakamura ........... G03G 15/757
2011/0266990 A1 11/2011 Murata et al.
2013/0078021 A1 3/2013 Sakamoto et al.
2014/0312819 A1 10/2014 Murata et al.
2015/0110525 A1 4/2015 Sakamoto et al.
2015/0369338 A1 12/2015 Sugita et al.
2016/0265624 A1 9/2016 Sugita et al.
2017/0010576 A1 1/2017 Takagi et al.
2018/0039221 A1 2/2018 Nakamoto et al.
2018/0347667 A1 12/2018 Sugita et al.
2020/0105237 A1 4/2020 Ishida et al.
2020/0233364 A1 * 7/2020 Shimizu ............. G03G 21/1857
2020/0244135 A1 7/2020 Sakamoto
2021/0103238 A1 4/2021 Sakamoto
2022/0299936 A1 9/2022 Sakamoto
(Continued)

FOREIGN PATENT DOCUMENTS

JP 4-064623 U 6/1992
JP 2000-179591 A 6/2000
JP 2003-142852 A 5/2003
(Continued)

*Primary Examiner* — Huan Le
(74) *Attorney, Agent, or Firm* — Harness, Dickey & Pierce, P.L.C.

(57) ABSTRACT

A drive transmitter is provided that includes an electromagnetic clutch, an energization part integrated with the electromagnetic clutch and to be electrically connected to a connection part of a device body, a field core integrated with the energization part, a rotor boss part, and a tilt restrictor in engagement with the energization part. The tilt restrictor restricts tilting of the field core to the rotor boss part when an external force is applied to the energization part from the connection part in electrical connection with the energization part.

10 Claims, 15 Drawing Sheets

(56) References Cited

U.S. PATENT DOCUMENTS

2024/0176276 A1 5/2024 Sakamoto

FOREIGN PATENT DOCUMENTS

| | | | |
|---|---|---|---|
| JP | 2008-020029 | A | 1/2008 |
| JP | 2011-247937 | A | 12/2011 |
| JP | 2013-145409 | A | 7/2013 |
| JP | 2013-174272 | A | 9/2013 |
| JP | 2024-079000 | A | 6/2024 |

* cited by examiner

DRIVE TRANSMITTER, DRIVER, AND IMAGE FORMING APPARATUS

CROSS-REFERENCE TO RELATED APPLICATIONS

This patent application is based on and claims priority pursuant to 35 U.S.C. § 119 (a) to Japanese Patent Application No. 2023-193205, filed on Nov. 13, 2023, in the Japan Patent Office, the entire disclosure of which is hereby incorporated by reference herein.

BACKGROUND

Technical Field

The present disclosure relates to a drive transmitter, a driver, and an image forming apparatus.

Related Art

A drive transmitter including an electromagnetic clutch with which an energization part is integrated has been proposed.

SUMMARY

Embodiments of the present invention provide a drive transmitter including an electromagnetic clutch, an energization part integrated with the electromagnetic clutch and to be electrically connected to a connection part of a device body, a field core integrated with the energization part, a rotor boss part, and a tilt restrictor in engagement with the energization part. The tilt restrictor restricts tilting of the field core to the rotor boss part when an external force is applied to the energization part from the connection part in electrical connection with the energization part.

BRIEF DESCRIPTIONS OF THE DRAWINGS

A more complete appreciation of embodiments of the present disclosure and many of the attendant advantages and features thereof can be readily obtained and understood from the following detailed description with reference to the accompanying drawings, wherein.

Figure 1:
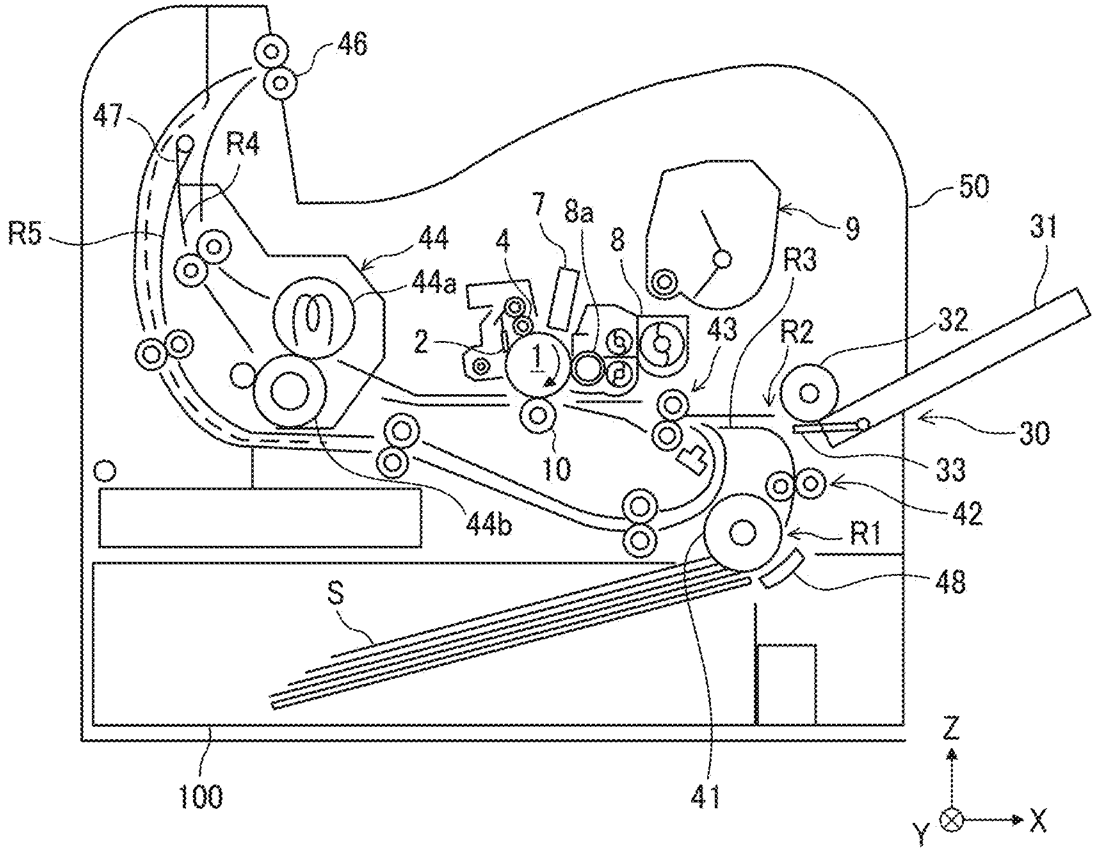
FIG. 1 is a schematic view of a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

It has been found that, in a case where a field core of an electromagnetic clutch is integrated with an energization part such as a connector including an energizing terminal, when a connection part of the device body is electrically connected to the energization part, abnormal noise occurs depending on the configuration of the connection part of the device body.

According to embodiments of the present disclosure, the occurrence of noise can be reduced in such a case where a field core of an electromagnetic clutch is integrated with an energization part such as a connector including an energizing terminal.

Now, an example of an electrophotographic printer (may be simply referred to as "printer") that forms an image by electrophotography is described as an electrophotographic image forming apparatus according to an embodiment of the present disclosure. In the present disclosure, the electrophotographic image forming apparatus is described, but the present disclosure is not limited thereto. Thus, the present disclosure is also applicable to, for example, an inkjet image forming apparatus or a stencil printing image forming apparatus.

At first, a description is given of a basic configuration of a printer according to an embodiment of this disclosure, with reference to FIG. 1. FIG. 1 is a schematic view of a printer according to the present embodiment. The directions of X, Y, and Z in the drawing are as follows, and the same applies to other drawings. The direction X is a direction parallel to the left and right of the printer and directed from left to right, in view from the front of the printer in FIG. 1. The direction of Y is a direction parallel to the front and rear of the printer and directed from front to rear. The direction of Z is a vertical direction from bottom to top.

In the drawing, the printer includes a photoconductor 1 as a latent image bearer, a body housing 50, and a sheet feeding cassette 100 detachably attachable to the body housing 50. The sheet feeding cassette 100 stores a plurality of recording sheets S in a sheet bundle.

The recording sheets S in the sheet feeding cassette 100 are each fed out from the sheet feeding cassette 100 by rotationally driving of a body sheet feeding roller 41. The uppermost recording sheet S is separated at the separation nip region formed by contact of the body sheet feeding roller 41 and a separation pad 48 and fed out to reach a body sheet conveyance passage R1. Thereafter, the recording sheet S is held between a pair of relay rollers 42 and conveyed in the body sheet conveyance passage R1 from the upstream side to the downstream side in the conveyance direction.

The body sheet conveyance passage R1 has a downstream end in communication with a common conveyance passage R3. A pair of registration rollers 43 is provided in the common conveyance passage R3. With the leading end of the recording sheet S in contact with the nip region of the pair of registration rollers 43 remaining stopped, the conveyance of the recording sheet S is stopped temporally. In response to the contact, skew of the leading end of the recording sheet S is corrected.

The pair of registration rollers 43 starts rotationally driving in synchrony with conveyance of the recording sheet S at a timing at which the recording sheet S contacts the surface of the photoconductor 1 to receive a toner image on the surface of the photoconductor 1 in the sheet transfer nip region. Then, the recording sheet S is conveyed toward the sheet transfer nip region. At this time, the pair of relay rollers 42 starts rotationally driving simultaneously with the start of rotation driving of the pair of registration rollers 43, so as to restart conveyance of the recording sheet S having been temporarily stopped.

The body housing 50 of the printer is provided with a manual sheet feeder 30 including a manual sheet feeding tray 31, a manual sheet feeding roller 32, and a separation pad 33. The recording sheet S placed on the manual sheet feeding tray 31 of the manual sheet feeder 30 is fed out from the manual sheet feeding tray 31 along with rotation driving of the manual sheet feeding roller 32, to a manual sheet conveyance passage R2.

The recording sheet S fed out by the manual sheet feeding roller 32 passes the separation nip region formed by contact of the manual sheet feeding roller 32 and the separation pad 33 in the manual sheet conveyance passage R2. Then, the recording sheet S is conveyed to the common conveyance passage R3 to be conveyed to the pair of registration rollers 43. Thereafter, similarly to the recording sheet S fed out from the sheet feeding cassette 100, the recording sheet S is sent to the transfer nip region after passing through the pair of registration rollers 43.

Around the drum-shaped photoconductor 1 rotationally driven in the clockwise direction in the drawing, a cleaning blade 2, a charging roller 4, a latent image writing device 7, a developing device 8, a transfer roller 10 are disposed. The charging roller 4 rotates while being in contact with the photoconductor 1 to form a charging nip region. The charging roller 4 is applied with a charging bias that is output from a power source for the charging roller 4. As a result, the surface of the photoconductor 1 is uniformly charged by the charging bias generated between the surface of the photoconductor 1 and the surface of the charging roller 4 in the charging nip region.

The latent image writing device 7 includes a light-emitting diode (LED) array and performs light scanning with LED light over the surface of the photoconductor 1 having been uniformly charged. As the latent image writing device 7 emits laser light beams onto the uniformly charged surface of the photoconductor 1, the electric potential of the irradiated (exposed) region of the charged surface of the photoconductor 1 attenuates, so that an electrostatic latent image is formed on the surface of the photoconductor 1.

As the photoconductor 1 rotates, the electrostatic latent image passes through a development region that is formed between the surface of the photoconductor 1 and the developing device 8 when the photoconductor 1 is brought to face the developing device 8. In this development region, toner is supplied to the electrostatic latent image of the photoconductor 1 by a developing roller 8*a*, so that the electrostatic latent image is developed.

A toner cartridge 9 is disposed above the developing device 8. The toner cartridge 9 supplies the toner stored therein to the developing device 8.

The toner image formed on the surface of the photoconductor 1 as a result of the development by the developing device 8 enters the transfer nip region formed by contact of the photoconductor 1 and the transfer roller 10 along with rotation of the photoconductor 1. An electric bias having the opposite polarity to the latent image electric potential of the photoconductor 1 is applied to the transfer roller 10. Accordingly, a transfer bias is formed within the transfer nip region.

As described above, the pair of registration rollers 43 conveys the recording sheet S toward the transfer nip region in synchrony with a timing at which the toner image formed on the photoconductor 1 is overlaid onto the recording sheet S in the transfer nip region. Due to the transfer bias and the nip pressure, as the recording sheet S is brought to close contact with the toner image formed on the photoconductor 1 in the transfer nip region, the toner image is transferred onto the recording sheet S.

Residual toner that is not transferred onto the recording sheet S remains on the surface of the photoconductor 1 after having passed through the transfer nip region. The residual toner that is not transferred is scraped off the surface of the photoconductor 1 by the cleaning blade 2 in contact with the photoconductor 1, so that the surface of the photoconductor 1 is cleaned.

The surface of the photoconductor 1 that is cleaned by the cleaning blade 2 is electrically discharged by an electric discharging device. Thereafter, the surface of the photoconductor 1 is uniformly charged again by the charging roller 4.

The recording sheet S having been passed through the transfer nip region formed by the contact of the photoconductor 1 and the transfer roller 10 is conveyed to a fixing device 44. The fixing device 44 includes a fixing roller 44*a* and a pressure roller 44*b*. The fixing roller 44*a* includes a heat generating source such as a halogen lamp. The pressure roller 44*b* is pressed against the fixing roller 44*a*. The fixing roller 44*a* and the pressure roller 44*b* have contact with each other to form a fixing nip region. Due to application of heat and pressure, the toner image is fixed to the surface of the recording sheet S that is held in the fixing nip region. Thereafter, the recording sheet S having passed through the fixing device 44 passes through a sheet ejection passage R4. Then, the recording sheet S is held in the sheet ejection nip region formed by mutual contact of a pair of sheet ejection rollers 46.

The printer switches printing modes between a single-side printing mode for single-side printing and a duplex printing mode for duplex printing. In the single-side printing mode, the printer prints an image on one side of the recording sheet S. By contrast, the printer prints respective images on both sides of the recording sheet S in the duplex printing mode. In the single-side printing mode or in the duplex printing mode in which respective images are formed on both sides of the recording sheet S, the pair of sheet ejection rollers 46 continues rotating forward and backward alternately, so that the recording sheet S in the sheet ejection passage R4 is ejected out of the printer. After passing through the fixing device 44, the recording sheet S is stacked on a sheet stacker provided on the top face of the body housing 50 of the printer.

By contrast, in the duplex printing mode in which an image is formed on one side of the recording sheet S, the pair of sheet ejection rollers 46 is rotated backward at the timing at which the trailing end of the recording sheet S enters the sheet ejection nip region formed by the mutual contact of the pair of sheet ejection rollers 46. At this time, a switching claw 47 disposed near the downstream end of the sheet ejection passage R4 moves to block (close) the sheet ejection passage R4 and open an entrance of a reverse conveyance passage R5 at the same time. As the recording sheet S starts reversing by the backward rotation of the pair of sheet ejection rollers 46, the recording sheet S is conveyed to the reverse conveyance passage R5.

The downstream end of the reverse conveyance passage R5 meets the common conveyance passage R3 on the upstream side from the pair of registration rollers 43 in the sheet conveyance direction. After being conveyed in the reverse conveyance passage R5, the recording sheet S is conveyed to the pair of registration rollers 43 in the common conveyance passage R3 again. Then, after a toner image has been formed on the other side of the recording sheet S in the transfer nip region, the recording sheet S passes through the fixing device 44, the sheet ejection passage R4, and the pair of sheet ejection rollers 46. The recording sheet S is then ejected out of the body housing 50 of the printer.

Figure 2:
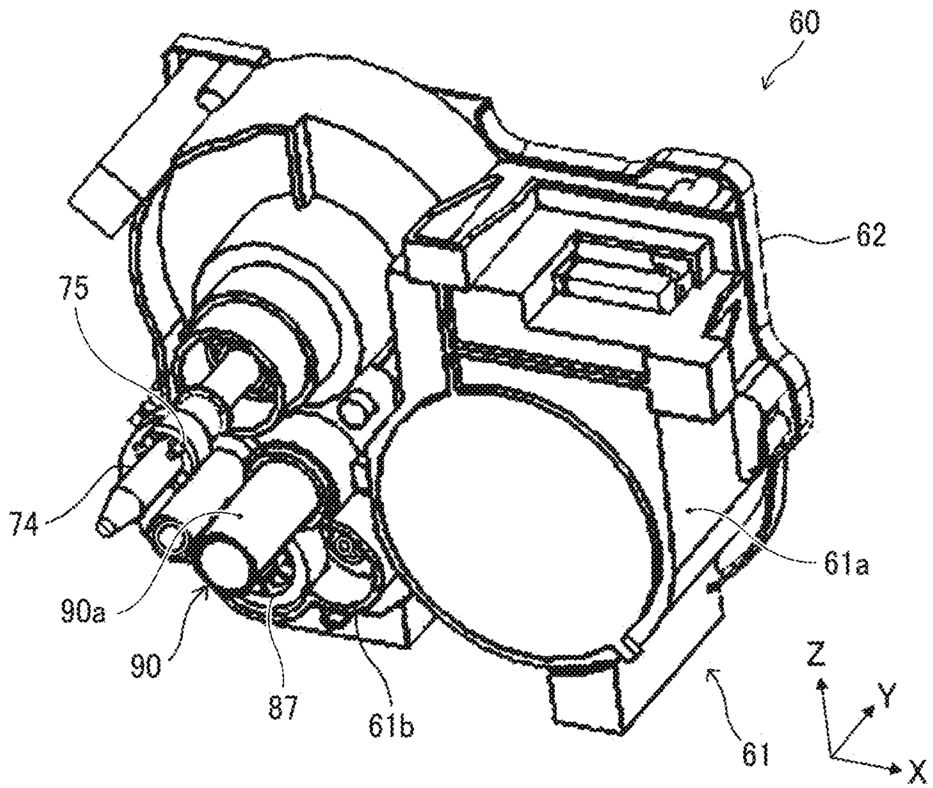
FIG. 2 is a schematic perspective view of a driver.

Next, a driver of the present embodiment will be described. FIG. 2 is a schematic perspective view of a driver 60 of an image formation unit. The driver 60 includes a drive motor 63 (see FIG. 3) and transmits the driving force of the drive motor 63 to the photoconductor 1, the developing device 8, the pair of registration rollers 43, and the body sheet feeding roller 41. The driver 60 further includes a resin housing 61 made of a flame-retardant resin and a mounting sheet metal 62. The resin housing 61 includes a motor housing part 61*a* covering the drive motor 63 (see FIG. 3) and a gear housing part 61*b* covering a gear.

A photoconductor drive shaft 74 has a leading end inserted in the photoconductor 1. The photoconductor drive shaft 74 and a coupling part 90*a* included in a developing drive transmission member 90 penetrate from the gear housing part 61*b*. A photoconductor coupling 75 is attached to the photoconductor drive shaft 74. The photoconductor coupling 75 engages with a flange of the photoconductor 1 to transmit a driving force to the photoconductor 1. A registration output gear 87 in the drawing outputs the driving force of the drive motor 63 to the pair of registration rollers 43.

Figure 3:
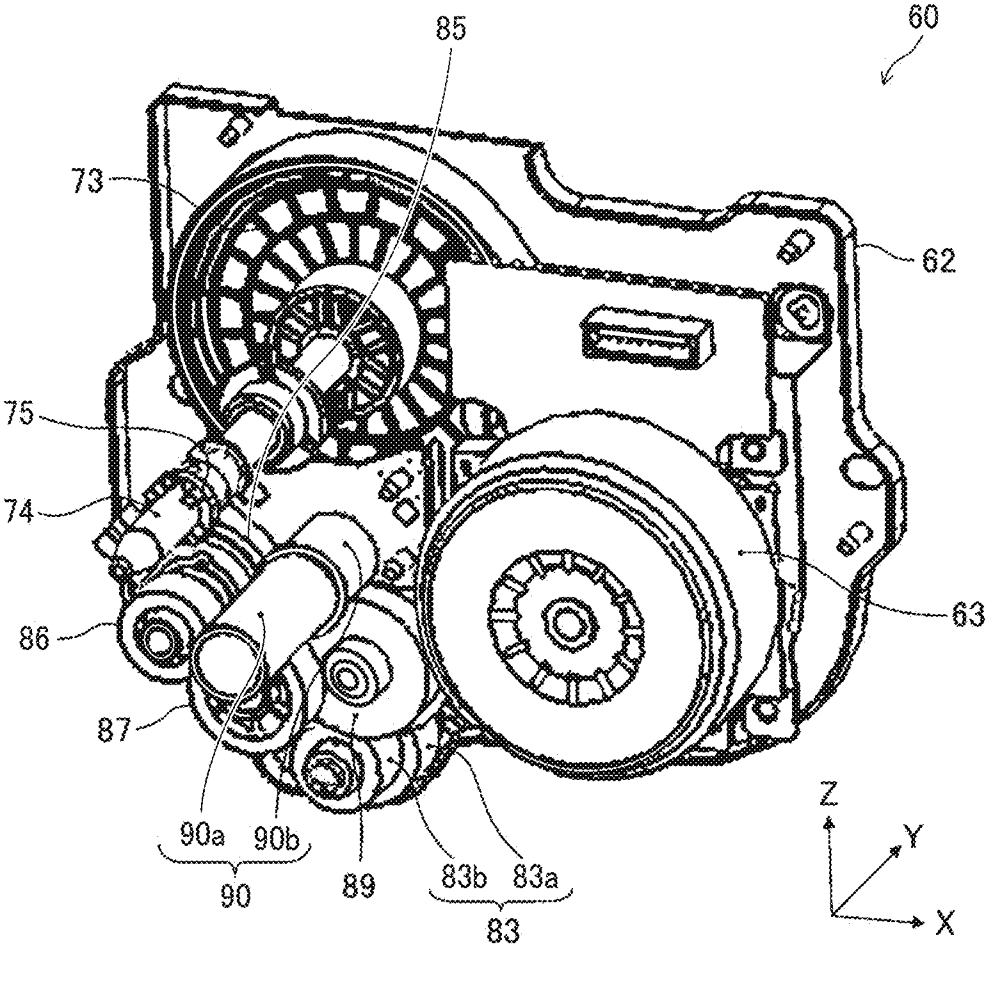
FIG. 3 is a schematic perspective view of the driver illustrated in FIG. 2 with a resin housing removed therefrom.
Figure 4:
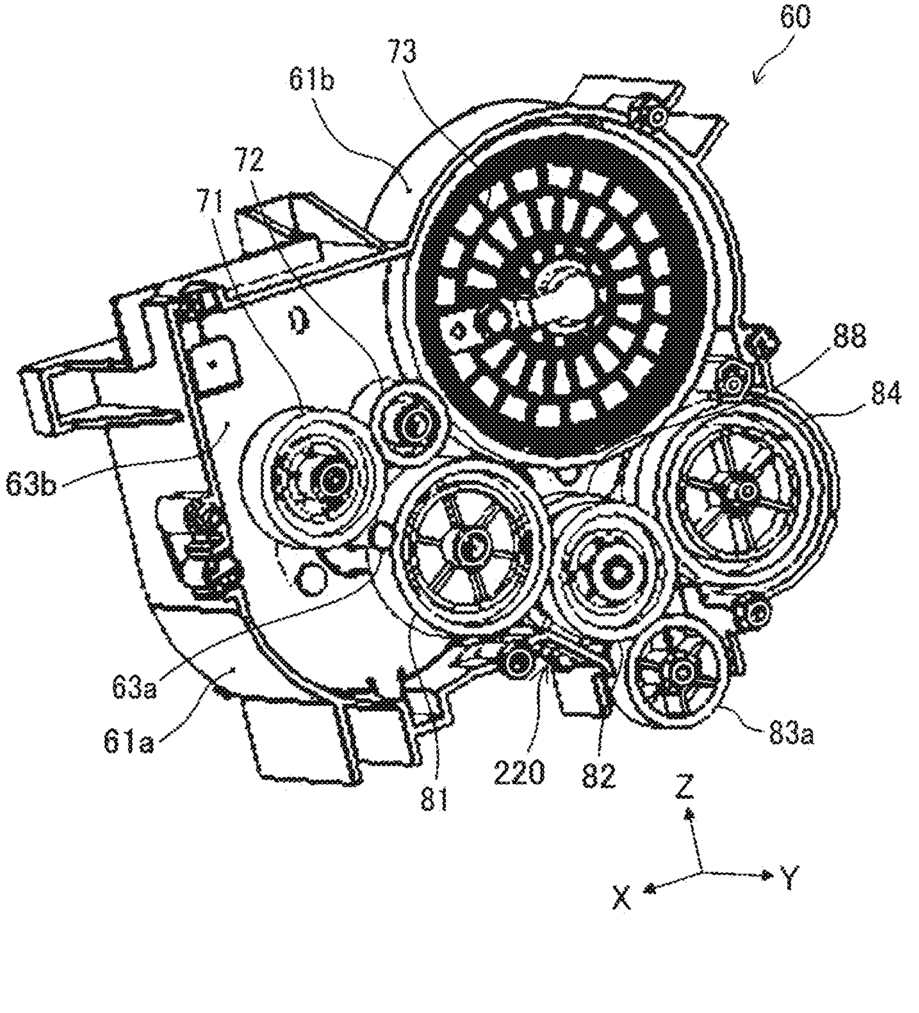
FIG. 4 is a perspective view of the driver illustrated in FIG. 2 with a mounting sheet metal (bracket) removed therefrom.

FIG. 3 is a schematic perspective view of the driver 60 with the resin housing 61 removed therefrom. FIG. 4 is a perspective view of the driver 60 with the mounting sheet metal 62 (bracket) removed therefrom as viewed from the mounting sheet metal 62 side.

As illustrated in FIG. 4, the drive motor 63 as an electric component includes a motor shaft 63*a* directly provided with a motor gear. A first input gear 71 and a second input gear 81 mesh with the motor gear. An idler gear 72 meshes with the first input gear 71, and a photoconductor gear 73 meshes with the idler gear 72. As illustrated in FIG. 3, the photoconductor gear 73 is attached to the photoconductor drive shaft 74. The first input gear 71, the second input gear 81, and the idler gear 72 are provided between the mounting sheet metal 62 and a motor bracket 63*b* made of a sheet metal.

A branch gear 82 meshes with the second input gear 81. The branch gear 82 meshes with a first sheet feeding gear 83*a* included in a sheet feeding-and-conveying gear 83 and a registration first gear 84. A developing electromagnetic clutch 88 as an electric component and a developing first gear 89 (see FIG. 3) are provided coaxially with the branch gear 82. The driving force is transmitted from the branch gear 82 to the developing first gear 89 through the developing electromagnetic clutch 88. The developing first gear 89 meshes with a developing gear part 90*b* included in the developing drive transmission member 90.

The sheet feeding-and-conveying gear 83 includes the first sheet feeding gear 83*a* and a second sheet feeding gear 83*b*. The second sheet feeding gear 83*b* transmits the driving force of the drive motor 63 to a sheet feeding-and-conveying drive transmission mechanism that transmits the driving force to the body sheet feeding roller 41.

A registration electromagnetic clutch 85 (see FIG. 3) as an electric component and a registration second gear 86 (see FIG. 3) are provided coaxially with the registration first gear 84. The registration second gear 86 transmits the driving force from the registration first gear 84 through the registration electromagnetic clutch 85. The registration second gear 86 meshes with the registration output gear 87 that outputs the driving force of the drive motor 63 to the pair of registration rollers 43.

In the present embodiment, the developing electromagnetic clutch 88 is of a connector integrated type as illustrated in FIG. 4. As illustrated in FIG. 4, a detent opening 220 is provided near the developing electromagnetic clutch 88 in the gear housing part 61*b*.

Figure 5:
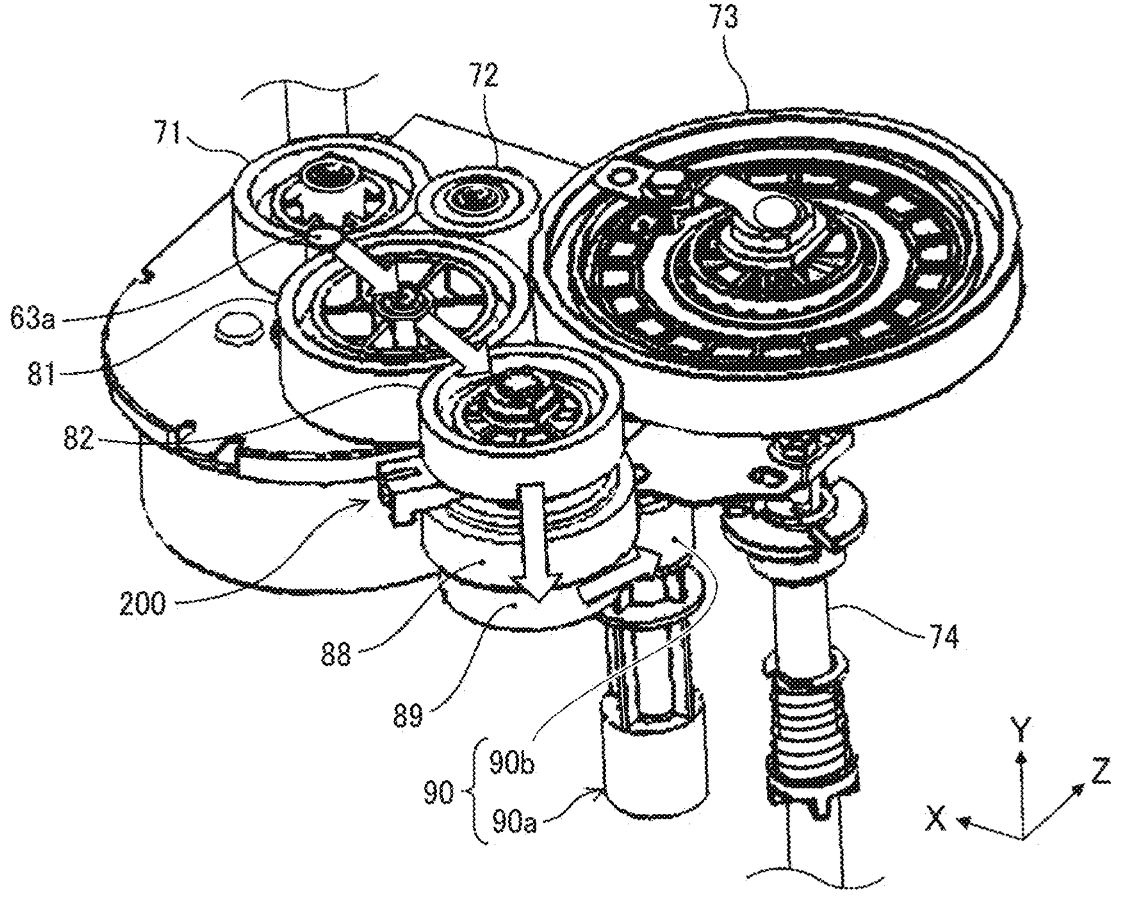
FIG. 5 is another perspective view of the driver illustrated in FIG. 2.

FIG. 5 is a perspective view of extracted members constituting a drive transmission path from the motor shaft 63*a* to the coupling part 90*a*. A member constituting a drive transmission path to the photoconductor drive shaft 74 is also illustrated. The developing electromagnetic clutch 88 integrated with a connector 200 is sandwiched between the branch gear 82 and the developing first gear 89 coaxial with each other.

The motor shaft 63*a* supplies drive not only to the image formation unit but also to drive targets such as a sheet feeding unit and a waste toner unit. Thus, the motor shaft 63*a* continues to rotate during a period in which any member of any unit is driven. Therefore, an electromagnetic clutch as a coupling interruption mechanism is provided in the middle of a plurality of drive transmission members in order to stop the motor shaft 63*a* for a period such as during development in which the motor shaft 63$a$ is not necessarily kept rotating or in a period in which the motor shaft 63$a$ is not necessarily driven for its life. With this arrangement, so-called travel distance for development is minimized. For the reason similar to the above, the registration electromagnetic clutch 85 described above is also provided (see FIG. 3).

Figure 6A:
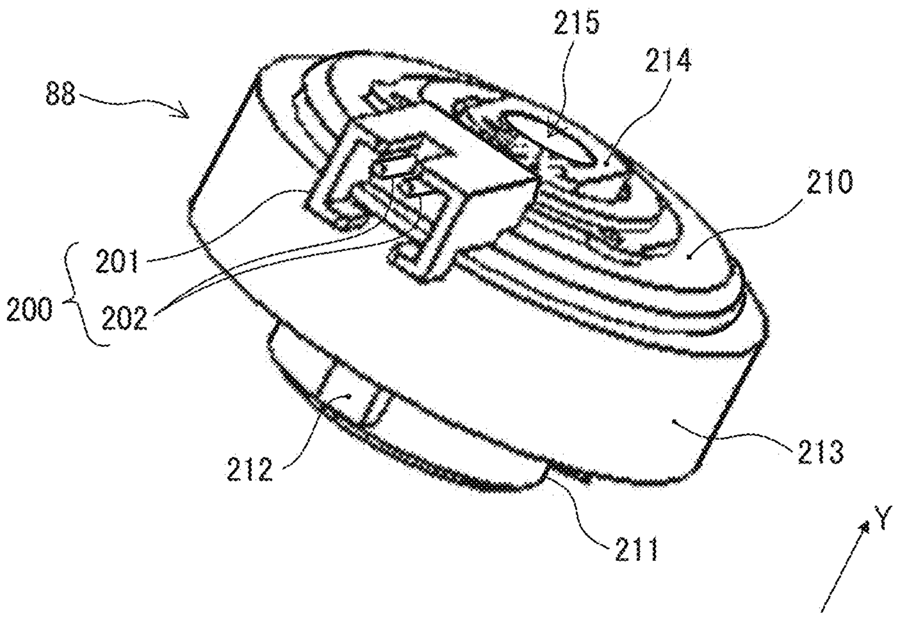
FIG. 6A is a perspective view of a developing electromagnetic clutch of a driver.
Figure 6B:
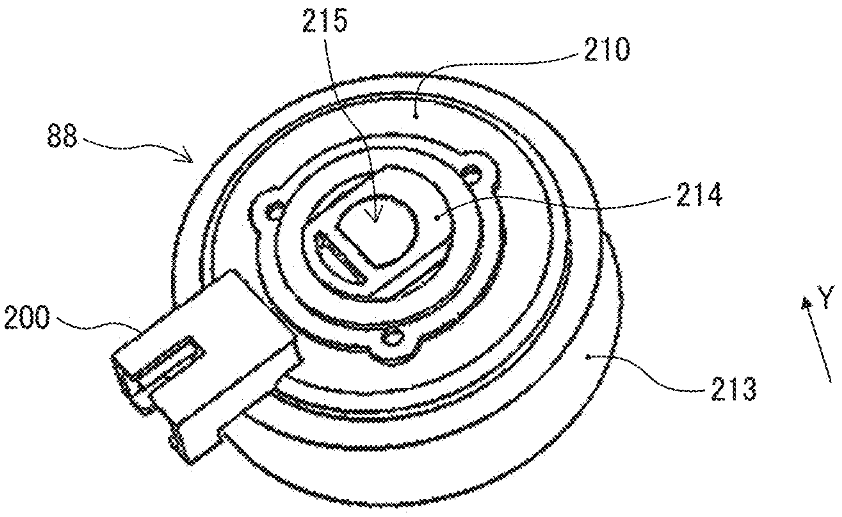
FIG. 6B is perspective view of the developing electromagnetic clutch of a driver.

FIGS. 6A and 6B are perspective views of the developing electromagnetic clutch 88 with the connector 200 as an energization part integrally attached thereto. FIGS. 6A and 6B are perspective views different in angle. In typical, an electromagnetic clutch such as the developing electromagnetic clutch 88 includes a field, an excitation coil, a pin, and a connector case. The field has an annular housing with its one end open. The excitation coil includes a coil wire and a spool, and is housed in the housing with the coil wire wound around the spool. The pin as a terminal is coupled to the spool and electrically connected to an end of the coil wire. The connector case as a holder holds the pin. The electromagnetic clutch also includes an armature, an armature hub, and a rotor, for example.

The connector 200 housing a pin 202 in a connector case 201 is integrated with a field core 210 made of sheet metal by, for example, adhesion. The connector 200 is also used as a field detent. A rotor boss 214 integrated with the rotor is slidably housed in a through hole at the center of the field core 210.

The rotor boss 214 has a boss hole 215 through which a cross-sectional D-cut portion of a shaft common to the branch gear 82 is inserted. As illustrated in FIG. 6A, an output part 211 is rotatably supported at a lower end that the shaft has. In the ON state of the developing electromagnetic clutch 88, the output part 211 is connected, through the armature, to the rotor that rotates integrally with the rotor boss 214 and rotates. The output part 211 has a transmission claw 212 radially protruding. A housing 213 covering the field and others may be integrated with the field or may be integrated with the output part 211 side.

The output part 211 of the developing electromagnetic clutch 88 is located in a recess of the developing first gear 89 facing the developing electromagnetic clutch 88 (see FIG. 5). An engaging part provided in the recess engages with the transmission claw 212 of the output part 211.

Figure 7:
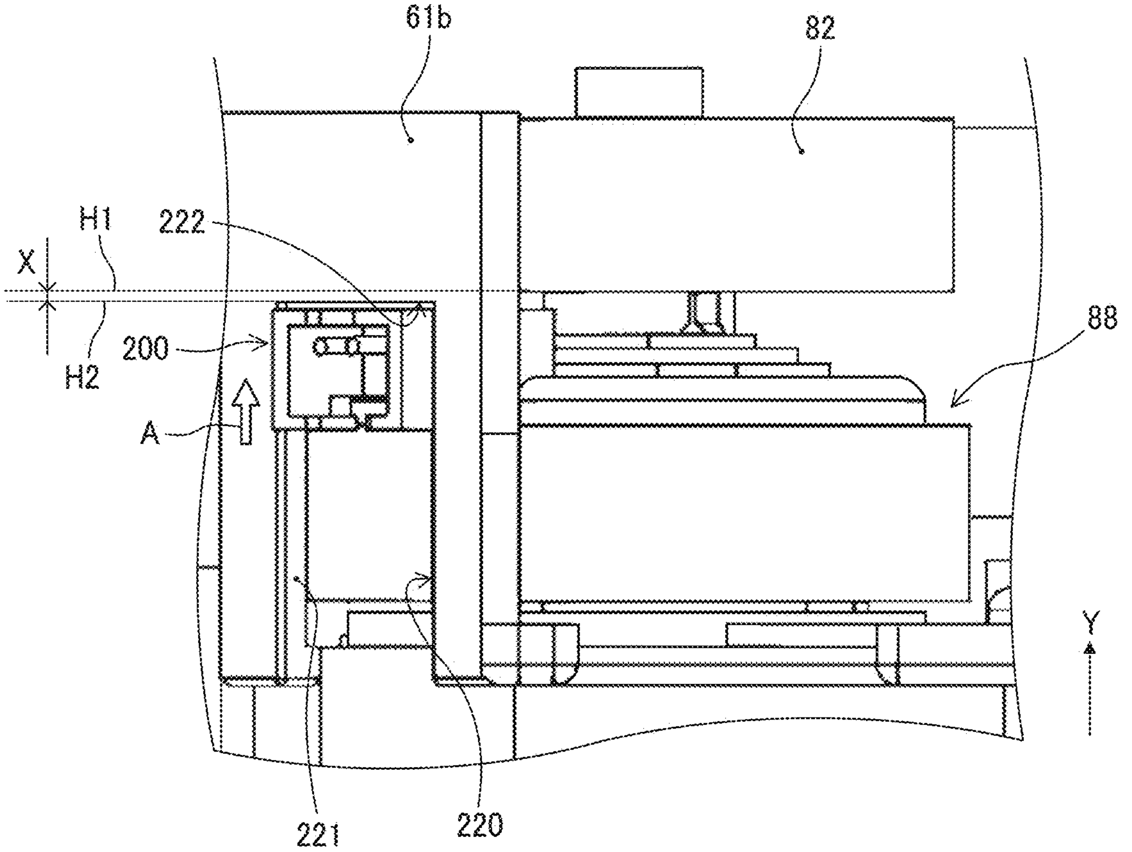
FIG. 7 is an enlarged perspective view of a basic configuration near a detent opening of a driver.

FIG. 7 is an enlarged perspective view of a basic configuration near the detent opening 220 also illustrated in FIG. 4. The detent opening 220 has one side face 221 and the other side face 221 in the direction around the axis of the detent opening 220. The side faces 221 function as a detent. The detent opening 220 has an end face 222 on the branch gear 82 side of the connector 200. The end face 222 functions as a thrust restrictor. That is, the end face 222 serves as a slide restrictor.

With the gear housing part 61$b$ secured to the mounting sheet metal 62 and with the branch gear 82, the developing electromagnetic clutch 88, and the developing first gear 89 positioned within the thrust direction in the driver 60, the position H2 of the end face 222 for thrust restriction is closer to the developing electromagnetic clutch 88 than the end face position H1 on the connector 200 side of the tooth face of the branch gear 82 is. With this arrangement, even if an external force in the direction of Y as indicated by the arrow A is applied in insertion of a connector of a harness 300 into the connector 200 or in extraction of the connector of the harness 300 from the connector 200, the connector 200 is prevented from colliding with the branch gear 82.

Figure 8A:
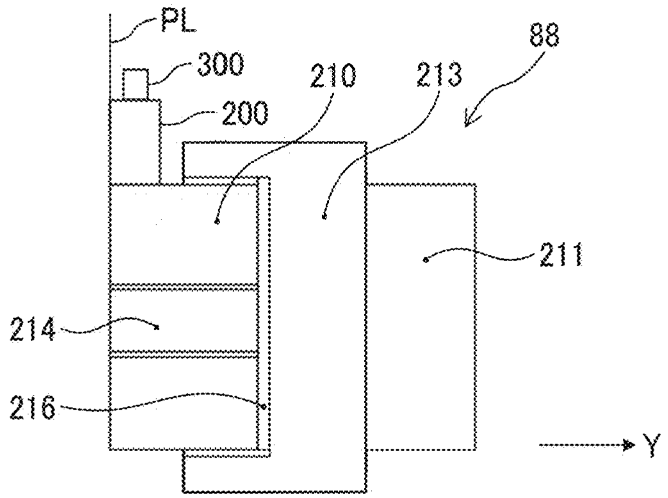
FIG. 8A is an explanatory view of a cause of abnormal noise.
Figure 8B:
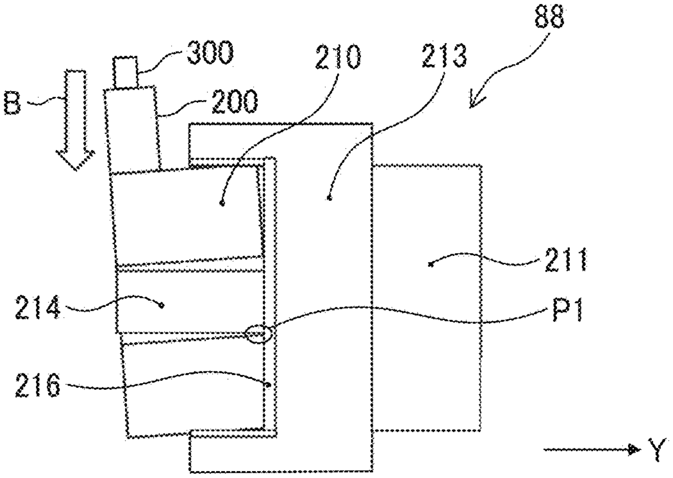
FIG. 8B is an explanatory view of a cause of abnormal noise.
Figure 8C:
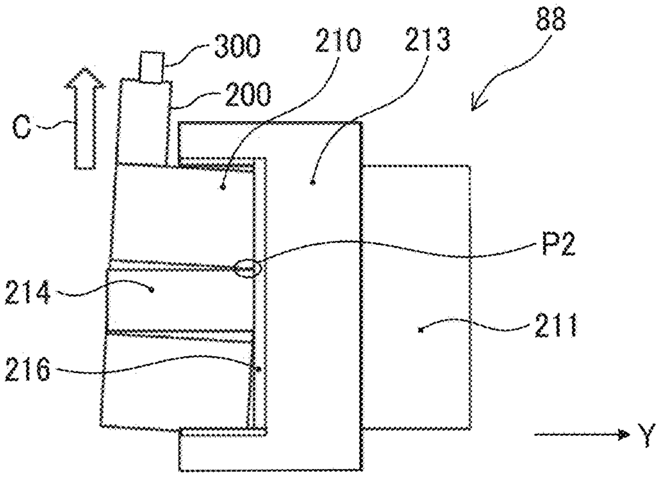
FIG. 8C is an explanatory view of a cause of abnormal noise.

In the above basic configuration, when the connector 200 is electrically connected to a connection part of the device body, it is found that abnormal noise occurs depending on the configuration of the connection part of the device body. As a result of intensive studies on the cause, the following is found. FIGS. 8A to 8C are explanatory views of the cause of the abnormal noise.

FIG. 8A is an explanatory view of a sliding structure of the field core 210 and the rotor boss 214. The rotor boss 214 is slidably inserted into a through hole at the center of the field core 210. This is a so-called clearance fit, and a clearance (fitting tolerance) is generated between the field core 210 and the rotor boss 214. In the illustrated example, it is assumed that the housing 213 integrated with the output part 211 is rotatably supported by the shaft penetrating the boss hole 215 of the rotor boss 214.

A rotor 216 is secured to the rotor boss 214. The rotor boss 214 and the rotor 216 are collectively referred to as a rotor boss part. The housing 213 and the rotor boss part rotate, whereas the field core 210 is stopped from rotating by the connector 200 and does not rotate. Therefore, the field core 210 rotates while sliding on the rotor boss part. The connection part at the leading end of the harness 300 is electrically connected to the connector 200.

In FIG. 8B, because a force acts axially on the connector 200 as indicated by the arrow B due to the load of the harness 300, the field core 210 tilts. The sliding of the field core 210 with the rotor boss part results in partial contact as indicated by the point P1, and thus a sliding failure occurs. In FIG. 8C, even if the load of the harness 300 acts on the connector 200 in the direction opposite to the axial direction as indicated by the arrow C, a sliding failure occurs due to partial contact as indicated by the point P2.

An increase in load due to such a sliding failure disadvantageously leads to lack of durability and loss, and partial contact is not yet eliminated by known techniques. In addition, vibration is generated in the sliding portion due to the partial contact, and abnormal noise occurs resulting from contact of the vibrating connector with a member of the detent.

Figure 9:
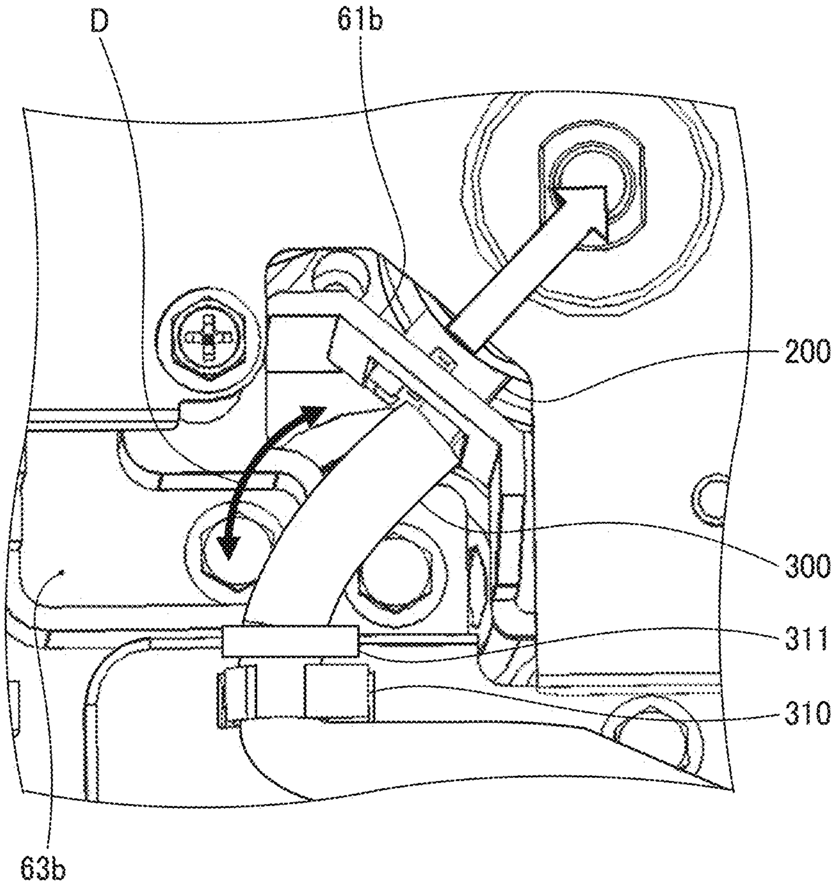
FIG. 9 is an explanatory view of a load application to a harness.

FIG. 9 is an explanatory view of a load application to the harness 300. For example, it is assumed that a clamp 310 and a binder 311 are immediately below the connector 200. The clamp 310 is for securing the harness 300 to a bracket made of, for example, a metal plate. The binder 311 binds the codes constituting a plurality of harnesses. The clamp 310 and the binder 311 prevent the connection part at the leading end of the harness 300 from coming off from the connector 200 and prevent the harness 300 from moving such that the harness 300 does not have contact with a rotatory part such as a gear. The binder 311 can also be provided on the opposite side across the clamp 310.

When the harness 300 with the stiffness D is held by the binder 311 being caught by the clamp 310, a force is applied axially to the field core 210 through the connector 200. That is, the harness 300 as the connection part of the device body to be electrically connected to the connector 200 as the energization part applies an external force to the connector 200 in electrical connection with the harness 300. The external force causes tilting of the field core 210 to the rotor boss part. Due to action of such an external force, such partial contact as described with reference to FIGS. 8B and 8C may occur.

Therefore, in the present embodiment, a tilt restrictor in engagement with the connector 200 restricts tilting of the field core 210 to the rotor boss part. This tilt restrictor restricts the tilting of the connector 200 in a tilting direction, and prevents the tilting of the field core 210 that causes a sliding failure.

Configuration Example 1

Figure 10A:
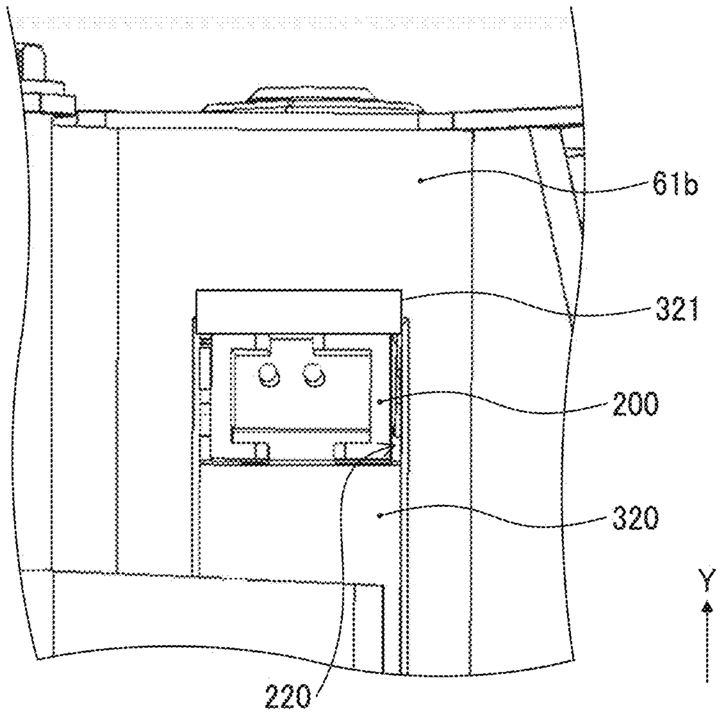
FIG. 10A is an explanatory view of a tilt restrictor of Configuration Example 1.
Figure 10B:
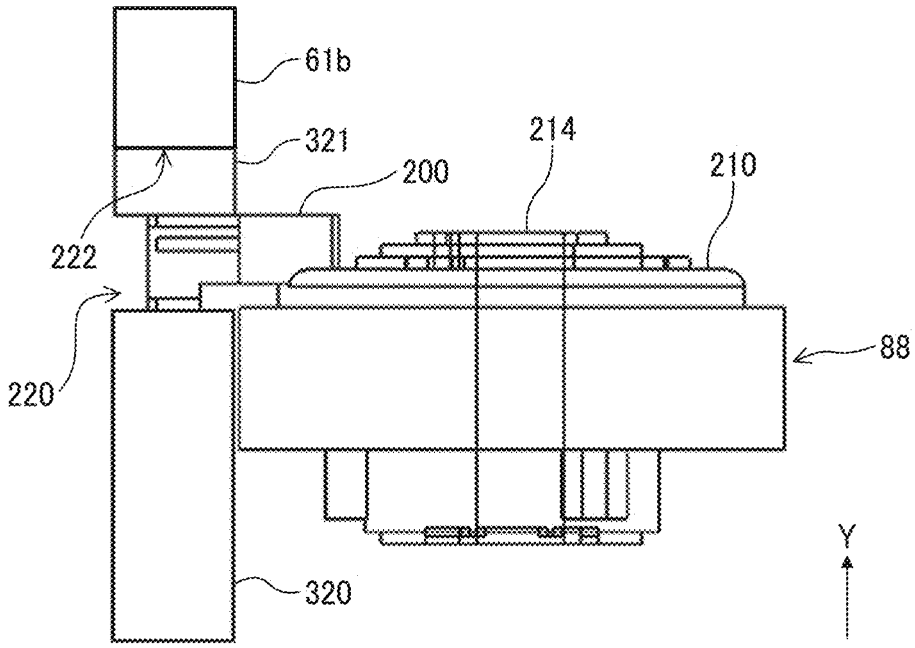
FIG. 10B is an explanatory view of the tilt restrictor of Configuration Example 1.

FIGS. 10A and 10B are explanatory views of a configuration of the tilt restrictor. In Configuration Example 1, a connector 200 has a detent opening 220 provided in a gear housing part 61*b*. The detent opening 220 has end faces. Of the end faces, an end face in a direction in which tilting of the connector 200 occurs restricts the connector 200 at the position where the connector 200 is kept horizontal. Here, keeping horizontal means keeping the posture of the connector 200 parallel to the virtual plane PL orthogonal to a rotor boss 214 as illustrated in FIG. 8A. For this restriction, a housing part 320 forming the lower end face of the detent opening 220 is added to the basic configuration in FIG. 7.

The side opposite to the direction in which the tilting of the connector 200 occurs restricts the tilting of the connector 200 by a damping material 321 sandwiched between the connector 200 and the end face of the gear housing part 61*b*. In the illustrated example, the damping material 321 is provided on the upper side in the drawings. Conversely, as illustrated in FIGS. 11A and 11B, a damping material 321 may be provided on the lower side in the drawings.

Figure 11A:
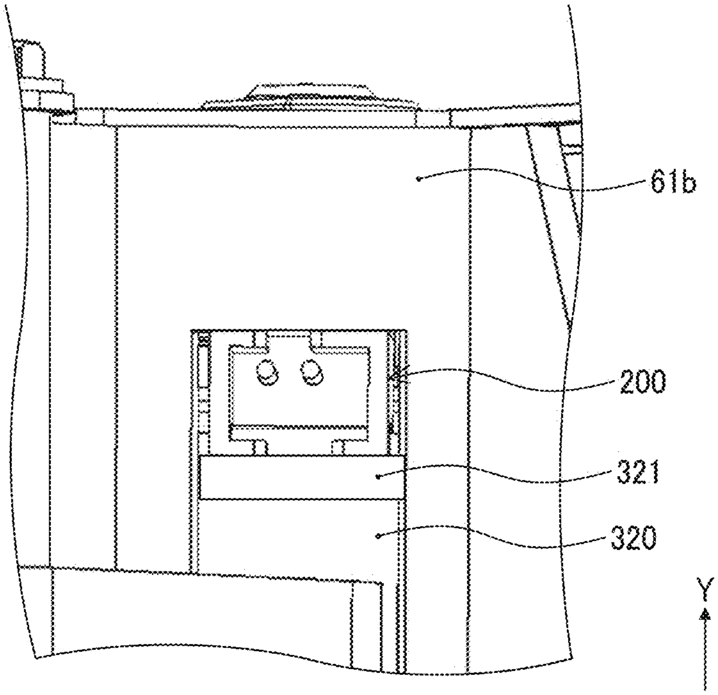
FIG. 11A is an explanatory view of a modification of Configuration Example 1.
Figure 11B:
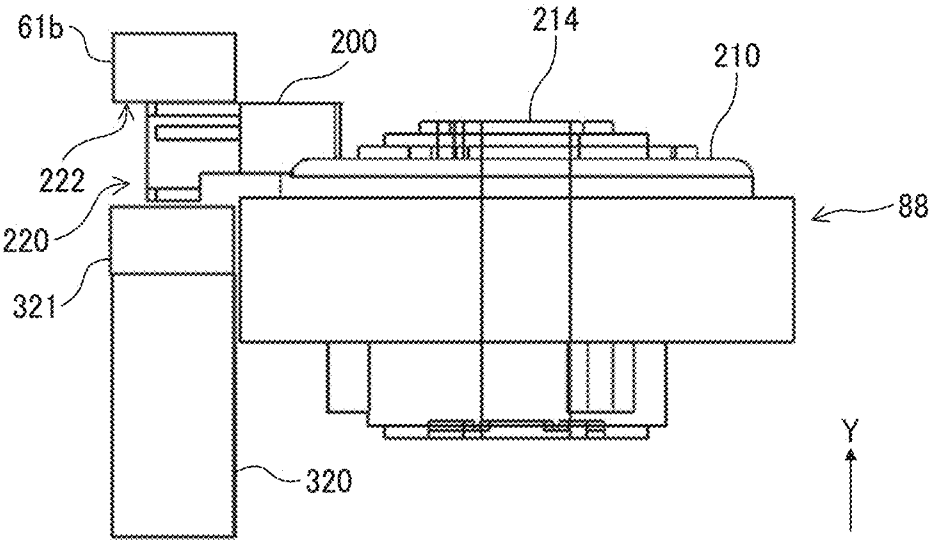
FIG. 11B is an explanatory view of the modification of Configuration Example 1.

In the case of FIGS. 10A and 10B and the case of FIGS. 11A and 11B, the end face of the gear housing part 61*b* above the detent opening 220 in the drawings and the additional housing part 320 each correspond to an opposed part facing the connector 200 from the direction in which the tilting is likely to occur, and the damping material 321 corresponds to a biasing member for biasing the connector 200 toward the opposed part. The biasing member is preferably provided between the opposed part on the side in the direction and the opposed part on the other side in the direction, and is preferably larger in thickness than a clearance between the opposed part on the side in the direction and the opposed part on the other side in the direction between which the energization part is interposed.

Configuration Example 2

Figure 12A:
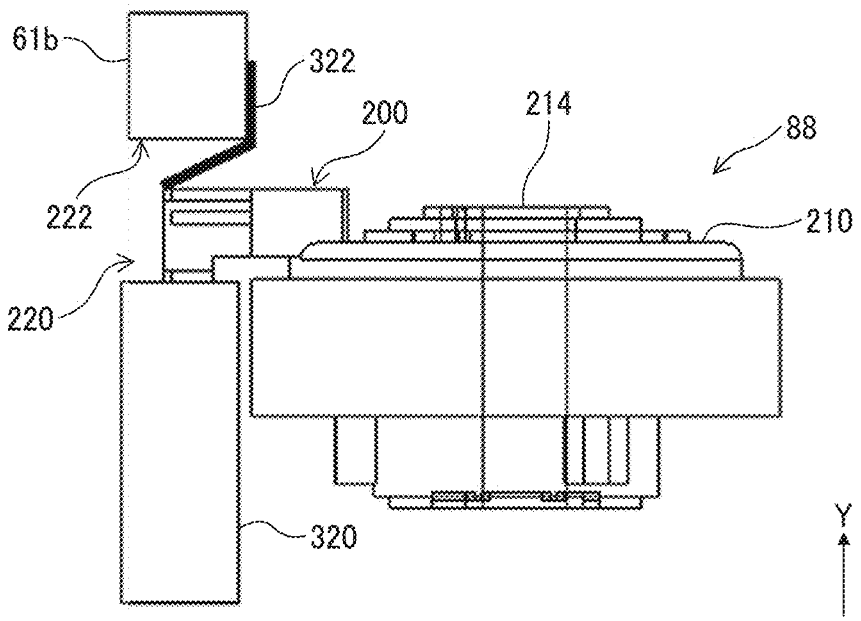
FIG. 12A is an explanatory view of a tilt restrictor of Configuration Example 2.
Figure 12B:
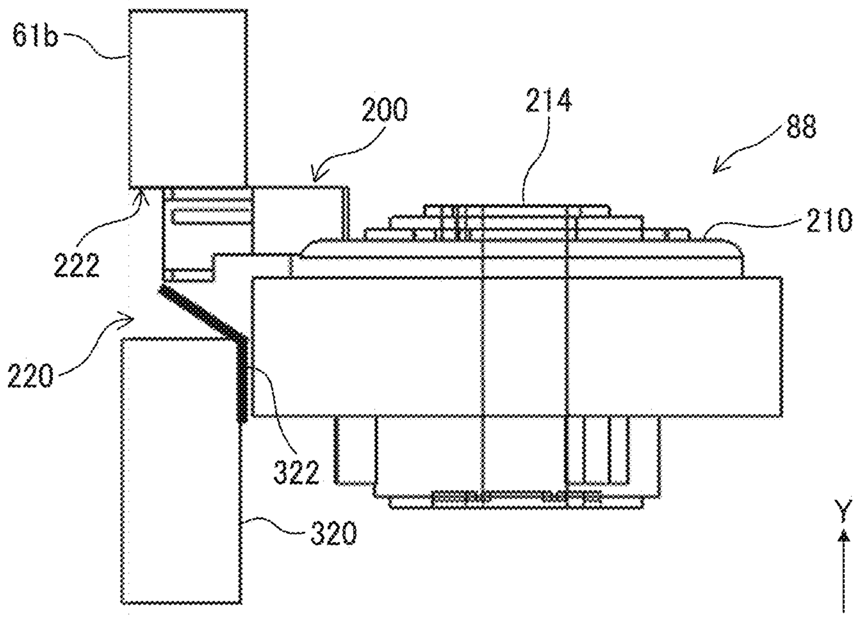
FIG. 12B is an explanatory view of the tilt restrictor of Configuration Example 2.

FIGS. 12A and 12B are explanatory views of another configuration of the tilt restrictor. Instead of the damping material 321 of FIGS. 11A and 11B, a resin material having flexibility or elasticity is provided. In the illustrated example, a polyethylene terephthalate (PET) plate 322 is provided. A securing end portion of the PET plate 322 is secured to a gear housing part 61*b* (FIG. 12A) on the upper side or an additional housing part 320 (FIG. 12B) by, for example, adhesion, and a connector 200 is biased at a free end extending in a bending state.

Configuration Example 3

Figure 13A:
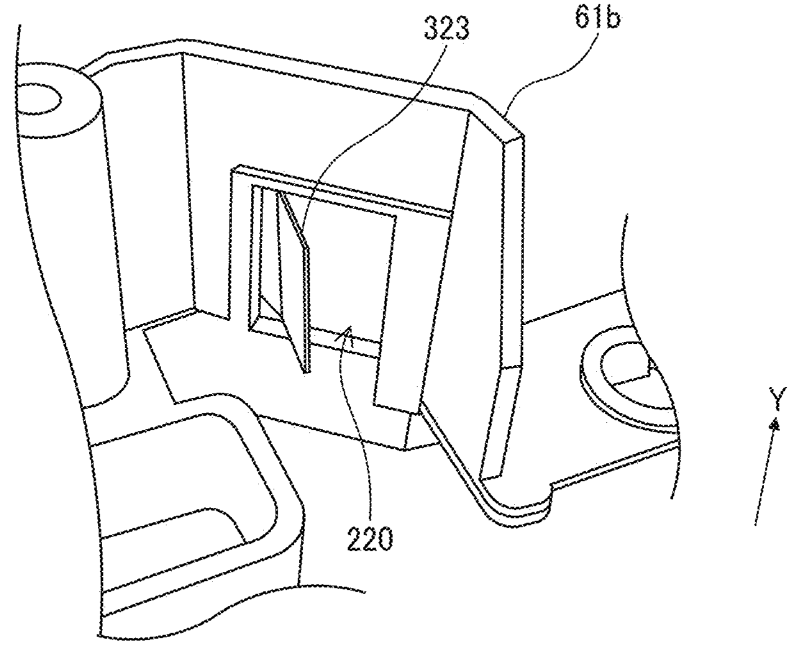
FIG. 13A is an explanatory view of a tilt restrictor of Configuration Example 3.
Figure 13B:
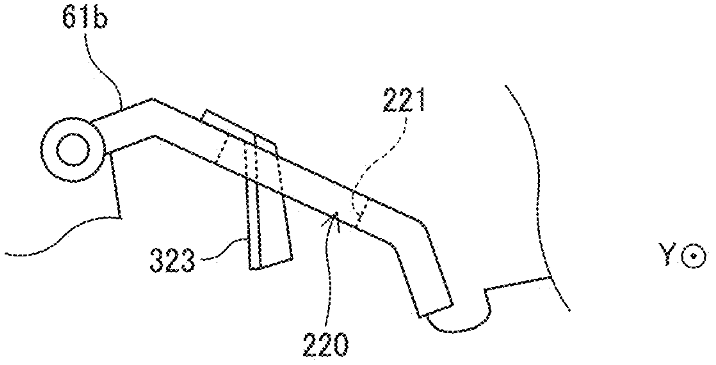
FIG. 13B is an explanatory view of the tilt restrictor of Configuration Example 3.

FIGS. 13A and 13B are explanatory views of still another configuration of the tilt restrictor. A PET plate 323 is provided for biasing and its attachment direction is different by 90° from the attachment direction of the PET plates 322 in FIGS. 12A and 12B. FIGS. 12A and 12B are explanatory views with a developing electromagnetic clutch 88 not mounted. In order to bias a connector 200 to be inserted into a detent opening 220 in the drawings, a face of the PET plate 323 to have contact with the connector 200 for biasing the connector 200 is inclined to face upward. A ridge line of bending of the PET plate 323 has an angle to a rotor boss 214. Contrary to the illustration, the face of the PET plate 323 may be inclined to bias the connector 200 downward. Such resin plates in FIGS. 12A and 12B and FIGS. 13A and 13B are inexpensive in comparison with the damping materials 321 in FIGS. 10A and 10B and FIGS. 11A and 11B.

Configuration Example 4

Figure 14:
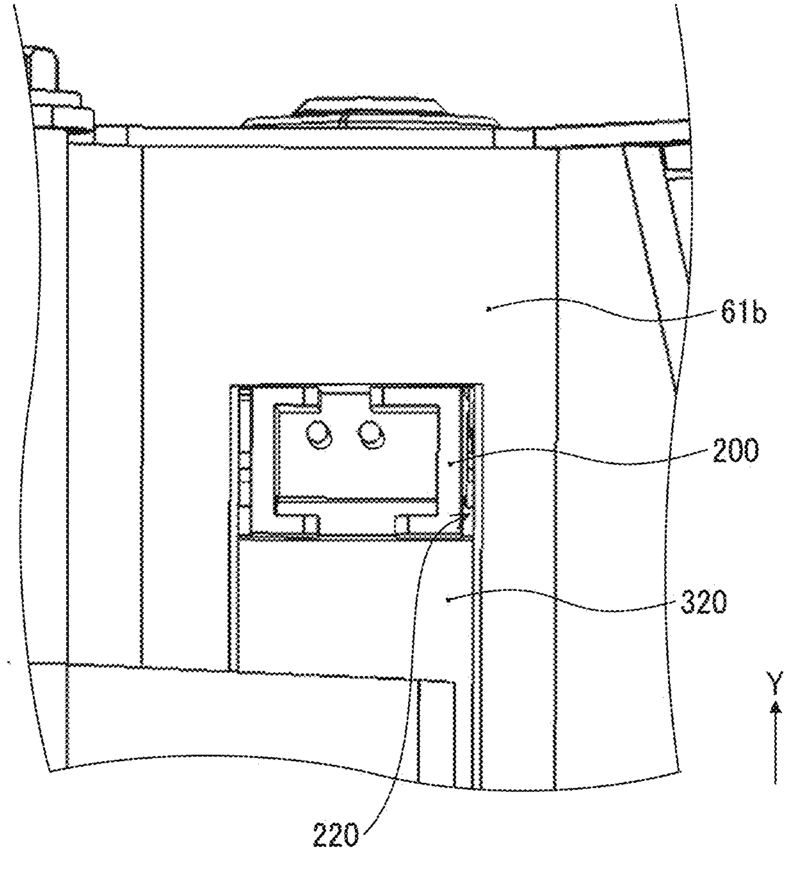
FIG. 14 is an explanatory view of a tilt restrictor of Configuration Example 4.

FIG. 14 is an explanatory view of still another configuration of the tilt restrictor. A connector 200 is lightly press-fitted between the upper and lower opening end faces of a detent opening 220 in the drawing. This arrangement enables reduction of the number of additional components.

The above-described embodiments are illustrative and do not limit the present disclosure. Unless otherwise limited in the above description, various modifications and changes can be made within the scope of the present disclosure described in the claims.

Figure 15A:
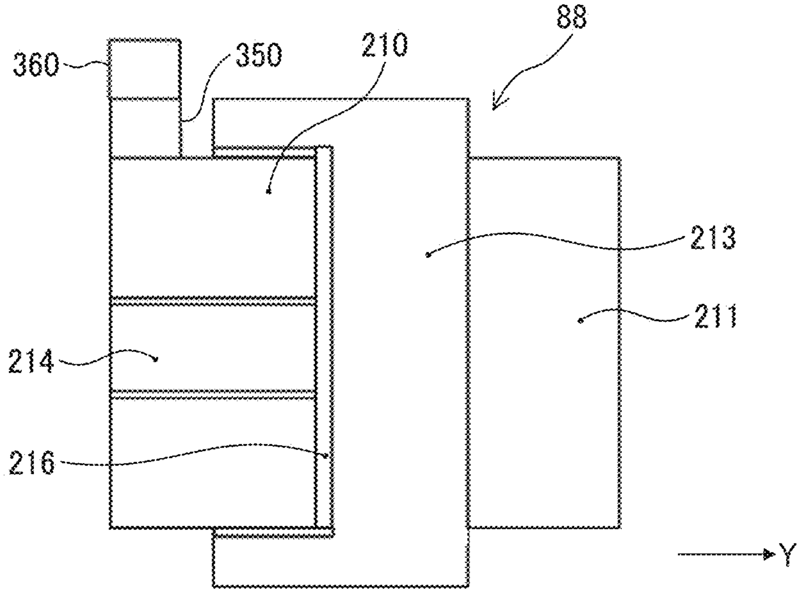
FIG. 15A is an explanatory view of a modification of an electromagnetic clutch to which the present disclosure is applicable.
Figure 15B:
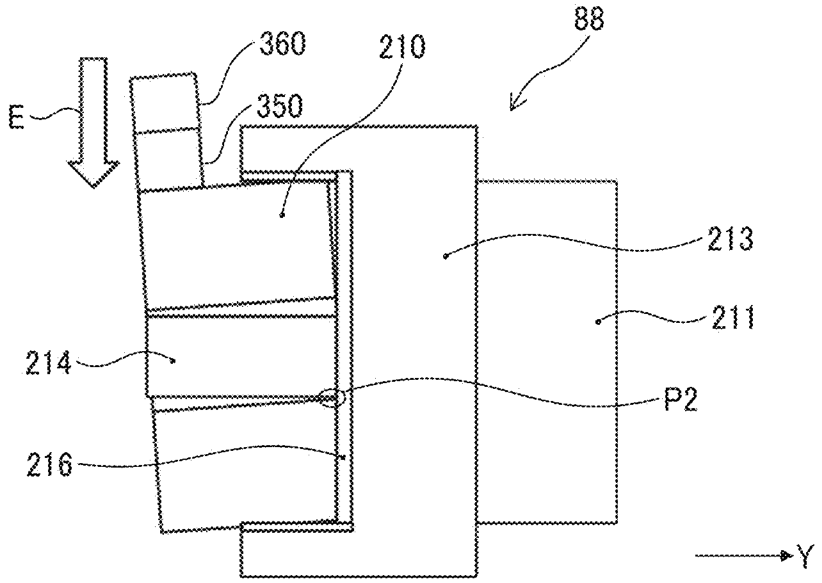
FIG. 15B is an explanatory view of the modification of the electromagnetic clutch to which the present disclosure is applicable.

For example, FIGS. 15A and 15B illustrate an example in which a conductive elastic member 360 is elastically brought into contact with an energization part 350 integrated with a field core 210 to be electrically connected to the energization part 350. Even in such an example, abnormal noise may occur due to tilting of a rotor boss 214, and thus the present disclosure is applicable as a countermeasure therefor.

In the above embodiments, the tilting of the rotor boss 214 is restricted by tilting from both sides in the direction in which the rotor boss 214 tilts. However, the connection part of the device body is to be electrically connected to the energization part, and the tilt restrictor may include a contact part to be against an external force applied from the connection part of the device body to the energization part in electrical connection with the connection part thereof and to have contact with the energization part from a side against the external force in the direction in which the tilting is likely to occur.

The effects appropriately described in the embodiments and examples of the present disclosure are merely listing examples of the effects obtained from embodiments of the present disclosure, and the effects according to the present disclosure are not limited to those described in the embodiments and examples of the present disclosure.

The embodiments described above are merely examples, and the various aspects of the present disclosure exert the respective effects as follows. Reference signs in parentheses with which constituents are denoted in each aspect indicate examples of the corresponding members. However, the constituents are not limited to the members.

Aspect 1

According to Aspect 1, a drive transmitter includes: an electromagnetic clutch (88); an energization part (200) integrated with the electromagnetic clutch (88) and to be electrically connected to a connection part of a device body; a field core (210) integrated with the energization part (200); a rotor boss part; and a tilt restrictor (320, 321, 322, 323) in engagement with the energization part (200). The tilt restrictor (320, 321, 322, 323) restricts tilting of the field core (210) to the rotor boss part when an external force is applied to the energization part (200) from the connection part in electrical connection with the energization part. This arrangement results in prevention of the occurrence of abnormal noise.

Aspect 2

According to Aspect 2, in the drive transmitter of Aspect 1, the tilt restrictor includes: an opposed part (222, 320) facing the energization part (200) from a side in a direction in which the tilting is likely to occur; and a biasing member (321, 322, 323) to bias, toward the opposed part (222, 320), the energization part (200) from another side in the direction. This arrangement results in restriction of the tilting, because the energization part (200) is engaged from both sides in the direction in which the tilting is likely to occur.

Aspect 3

According to Aspect 3, in the drive transmitter of Aspect 2, the tilt restrictor further includes another opposed part (222, 320) facing the energization part (200) from the another side in the direction, the biasing member is disposed between the opposed part (222, 320) and the another opposed part (222, 320), and the biasing member is a damping material (321) having a thickness larger than a clearance between the opposed part (222, 320) and the another opposed part (222, 320) between which the energization part (200) is interposed. This arrangement results in restriction of the tilting by the elastic force of the damping material (321).

Aspect 4

According to Aspect 4, in the drive transmitter of Aspect 2, the biasing member includes a resin material (322, 323) having flexibility or elasticity. This arrangement results in reduction of the cost.

Aspect 5

According to Aspect 5, in the drive transmitter of Aspect 4, the resin material (323) is in a plate shape and has a face inclined in the direction in which the tilting is likely to occur, and the face biases the energization part (200) toward the opposed part.

Aspect 6

According to Aspect 6, in the drive transmitter of Aspect 1, the tilt restrictor (320, 321, 322, 323) further includes a contact part to have contact with the energization part (200) against the external force in the direction in which the tilting is likely to occur. This arrangement results in restriction of the tilting, by the contact force balanced with the external force.

Aspect 7

According to Aspect 7, in the drive transmitter of Aspect 1, the tilt restrictor includes an opposed part facing the energization part (200) from a side in a direction in which the tilting is likely to occur and another opposed part facing the energization part (200) from another side in the direction, and the energization part (200) is lightly press-fitted between the opposed part and the another opposed part. This arrangement results in reduction of the number of additional components.

Aspect 8

According to Aspect 8, in the drive transmitter of any one of Aspects 1 to 6, the tilting is likely to occur due to a clearance between the field core (210) and the rotor boss part.

Aspect 9

According to Aspect 9, a driver (60) includes: the drive transmitter of any one of Aspects 1 to 8; and a drive source.

This arrangement exerts, in the driver, the effects described in Aspects 1 to 8.

Aspect 10

According to Aspect 10, an image forming apparatus includes the driver of Aspect 9. This arrangement exerts, in the image forming apparatus, the effects described in Aspects 1 to 8.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A drive transmitter comprising:
an electromagnetic clutch;
an energization part integrated with the electromagnetic clutch and configured to be electrically connected to a connection part of a device body;
a field core integrated with the energization part;
a rotor boss part; and
a tilt restrictor in engagement with the energization part, the tilt restrictor configured to restrict tilting of the field core to the rotor boss part when an external force is applied to the energization part from the connection part in electrical connection with the energization part.

2. The drive transmitter according to claim 1,
wherein the tilt restrictor includes:
an opposed part facing the energization part from a side in a direction orthogonal to the external force; and
a biasing member configured to bias, toward the opposed part, the energization part from another side in the direction.

3. The drive transmitter according to claim 2,
wherein the tilt restrictor further includes another opposed part facing the energization part from the another side in the direction, and
the biasing member is between the opposed part and the another opposed part, the biasing member being a damping material having a thickness larger than a clearance between the opposed part and the another opposed part between which the energization part is interposed.

4. The drive transmitter according to claim 2,
wherein the biasing member includes a resin material having flexibility or elasticity.

5. The drive transmitter according to claim 4,
wherein the resin material is in a plate shape and has a face inclined in the direction, the face configured to bias the energization part toward the opposed part.

6. The drive transmitter according to claim 1,
wherein the tilt restrictor further includes a contact part configured to have contact with the energization part against the external force in a direction orthogonal to the external force.

7. The drive transmitter according to claim 1,
wherein the tilt restrictor includes:
an opposed part facing the energization part from a side in a direction orthogonal to the external force; and
another opposed part facing the energization part from another side in the direction,
wherein the energization part is press-fitted between the opposed part and the another opposed part.

8. The drive transmitter according to claim 1,
wherein the tilt restrictor is configured to restrict the tilting of the field core due to a clearance between the field core and the rotor boss part.

9. A driver comprising:
the drive transmitter according to claim 1; and
a drive source.

10. An image forming apparatus comprising the driver according to claim 9.

* * * * *